United States Patent
Kessler et al.

(10) Patent No.: US 11,521,167 B2
(45) Date of Patent: Dec. 6, 2022

(54) METHOD AND DEVICE FOR MONITORING SUPPLY

(71) Applicant: Henkel AG & Co. KGaA, Duesseldorf (DE)

(72) Inventors: Arnd Kessler, Monheim am Rhein (DE); Christian Nitsch, Duesseldorf (DE); Lars Zuechner, Langenfeld (DE); Georg Wawer, Vienna (AT); Alexander Mueller, Monheim (DE)

(73) Assignee: HENKEL AG & CO. KGAA, Duesseldorf (DE)

( * ) Notice: Subject to any disclaimer, the term of this patent is extended or adjusted under 35 U.S.C. 154(b) by 997 days.

(21) Appl. No.: 16/318,080

(22) PCT Filed: Jul. 11, 2017

(86) PCT No.: PCT/EP2017/067346
§ 371 (c)(1),
(2) Date: Jan. 15, 2019

(87) PCT Pub. No.: WO2018/011179
PCT Pub. Date: Jan. 18, 2018

(65) Prior Publication Data
US 2021/0287267 A1 Sep. 16, 2021

(30) Foreign Application Priority Data
Jul. 15, 2016 (DE) .................. 10 2016 212 981.3

(51) Int. Cl.
*G06Q 30/06* (2012.01)
*G06Q 10/08* (2012.01)
(Continued)

(52) U.S. Cl.
CPC .......... *G06Q 10/087* (2013.01); *D06F 33/37* (2020.02); *G06Q 30/0601* (2013.01);
(Continued)

(58) Field of Classification Search
None
See application file for complete search history.

(56) References Cited

U.S. PATENT DOCUMENTS 5,839,454 A * 11/1998 Matz ................. A47L 15/4418
134/104.1
7,754,025 B1 7/2010 Crisp, III
(Continued)

FOREIGN PATENT DOCUMENTS

| EP | 691101 A1 * | 1/1996 | ......... A47L 15/4257 |
| EP | 2282184 A1 | 2/2011 | |
| EP | 2784205 A1 | 10/2014 | |

OTHER PUBLICATIONS

Bedarfsermittlung. Aus: Wikipedia, derfreien Enzyklopadie; Bearbeitungsstand: Jun. 27, 2016 um 11:18 Uhr; URL: https:de.wikipdia.org/wiki/Bedarfsermittlung—Publication date unknown (Year: 2016).*

(Continued)

*Primary Examiner* — Nicholas D Rosen
(74) *Attorney, Agent, or Firm* — Lorenz & Kopf, LLP (57) ABSTRACT

A method is provided for monitoring a supply of a cleaning agent. The method includes performing a check of whether the supply of the cleaning agent is likely to be used up. The check is based, at least in part, on quantity information which is representative of an amount of the cleaning agent in a user's supply and on consumption information which is indicative of the user's expected consumption behavior with respect to the cleaning agent. Further, a device is provided for performing the method for monitoring the supply of the cleaning agent.

18 Claims, 5 Drawing Sheets

(51) Int. Cl.
*D06F 33/37* (2020.01)
*D06F 103/00* (2020.01)
*D06F 103/18* (2020.01)
*D06F 103/22* (2020.01)
*D06F 105/00* (2020.01)
*D06F 105/42* (2020.01)
*D06F 105/58* (2020.01)
*D06F 34/28* (2020.01)
*D06F 39/02* (2006.01)

(52) U.S. Cl.
CPC .............. *D06F 34/28* (2020.02); *D06F 39/02* (2013.01); *D06F 2103/00* (2020.02); *D06F 2103/18* (2020.02); *D06F 2103/22* (2020.02); *D06F 2105/00* (2020.02); *D06F 2105/42* (2020.02); *D06F 2105/58* (2020.02)

(56) References Cited

U.S. PATENT DOCUMENTS

| | | | |
|---|---|---|---|
| 9,115,457 B2* | 8/2015 | Yang | D06F 33/47 |
| 9,469,933 B2* | 10/2016 | Miller | D06F 33/37 |
| 11,186,935 B2* | 11/2021 | Kessler | D06F 33/00 |
| 2001/0049846 A1 | 12/2001 | Guzzi et al. | |
| 2002/0161652 A1* | 10/2002 | Paullin | G06K 17/00 |
| | | | 705/22 |
| 2004/0186788 A1* | 9/2004 | Czuchry, Jr. | G06Q 10/08 |
| | | | 705/26.1 |
| 2004/0216522 A1* | 11/2004 | Koike | G01F 23/683 |
| | | | 73/319 |
| 2009/0269088 A1* | 10/2009 | Mizuta | G03G 15/0872 |
| | | | 399/30 |
| 2010/0218564 A1* | 9/2010 | Aisa | F16F 9/3292 |
| | | | 68/23.1 |
| 2012/0314059 A1 | 12/2012 | Hoffmann | |
| 2013/0314234 A1* | 11/2013 | Yang | D06F 33/47 |
| | | | 340/612 |
| 2014/0367401 A1* | 12/2014 | Stralin | A47K 10/38 |
| | | | 221/6 |
| 2015/0026109 A1* | 1/2015 | Park | G06N 3/0427 |
| | | | 706/46 |
| 2015/0105880 A1 | 4/2015 | Slupik et al. | |
| 2015/0330013 A1* | 11/2015 | Miller | G05B 19/0428 |
| | | | 68/17 R |
| 2015/0355012 A1 | 12/2015 | Gurumohan et al. | |
| 2015/0366411 A1* | 12/2015 | Yang | A47K 5/1217 |
| | | | 222/25 |

OTHER PUBLICATIONS

Perez, S., "Amazon's Supply Reordering Service Gets Integrated in Nearly a Dozen More Household Devices From GE, Samsung, Oster and More," AOL Inc., Oct. 1, 2015. (Year: 2015).*
Weise, E., "Amazon makes it easy to order automatically: Restocking your home just got easier, with a touch of a button," USA Today, (McLean, Virginia) Jan. 20, 2016: B.5. (Year: 2016).*
Rosen, N.D., "Supplement to Perez article," prepared Feb. 4, 2022. (Year: 2022).*
EPO, International Search Report and Written Opinion issued in International Application No. PCT/EP2017/067346, dated Aug. 21, 2017.
Beschaffungslogistik. Aus Wikipedia, derfreien Enzyklopädie; Bearbeitungsstand: Jun. 10, 2016 um 14:37 Uhr; URL: https://de.wikipedia.org/wiki/Beschaffungsprinzip—Publication date unknown.
Beschaffungsprinzip. Aus Wikipedia, derfreien Enzyklopädie; Bearbeitungsstand: Jul. 13, 2016 um 17:06 Uhr; URL: https://de.wikipedia.org/wiki/Beschaffungslogistik—Publication date unknown.

* cited by examiner

METHOD AND DEVICE FOR MONITORING SUPPLY

CROSS-REFERENCE TO RELATED APPLICATION

This application is a U.S. National-Stage entry under 35 U.S.C. § 371 based on International Application No. PCT/EP2017/067346, filed Jul. 11, 2017 which was published under PCT Article 21(2) and which claims priority to German Application No. 10 2016 212 981.3, filed Jul. 15, 2016, which are all hereby incorporated in their entirety by reference.

TECHNICAL FIELD

The present disclosure relates to methods and devices for monitoring the supply of cleaning agents. The methods and devices described herein can assist with the reordering of cleaning agents and can be used, for example, for the automated reordering of cleaning agents.

BACKGROUND

Cleaning agents are used in a domestic setting for cleaning various objects, for example, or for assisting or complementing the cleaning process. For example, a cleaning agent, e.g. a detergent, is used in washing machines to clean textiles.

When automatic domestic washing machines of this type are used for textiles, the detergent is generally metered from a storage container. In this case, the detergent is generally poured into the washing machine by employing a dispensing apparatus. Alternatively, the detergent can also be poured in by employing a metering aid, or even introduced directly into the washing drum with the laundry. In each case, the amount to be metered is simultaneously set by the user during the pouring process. The detergent is generally metered before the washing process begins, i.e. before water flows through the dispensing apparatus.

In this case, the detergent is stored in the storage container. The user generally has to monitor the supply in the storage container and, if necessary, repurchase the appropriate detergent if the supply is used up.

EP 2 784 205 A1 discloses using a storage container in a receiving apparatus on the household appliance and coupling said container to the household appliance, instead of pouring in the detergent manually. This can simplify the metering process and prevent too much or too little detergent being metered, for example.

However, in each case, it may be that it is only when the user wishes to use the detergent that they notice that the detergent has been used up, or has almost been used up, and can therefore not be used as planned.

Another issue is that there is sometimes a plurality of detergents. For example, there is often a general-purpose detergent, a color detergent, a bleaching agent, a detergent for black laundry, and/or a softener available. It may therefore be difficult simply to get an appropriate overview. The user also has to note precisely which type of detergent has run out so that the correct detergent is repurchased.

In order to address this issue, the prior art in WO 01/96645 A2 discloses providing a storage container for a detergent comprising a fill-level sensor or weight sensor in order to monitor the current supply of detergent in the storage container. It is provided here that an inventory module can order replacement detergent electronically when the detergent fill level reaches a predetermined fill level in the storage container. This means that, in the prior art, the detergent is supplied directly by a fill level measurement, and reordering can be triggered at a predefined absolute fill level.

Different variants of sensors for determining fill levels of containers for different goods are also known, for example from WO 2015/076952, EP 2 718 679, EP 2 282 184 or WO 2015/187545.

However, if the user requires e.g. a larger amount than can be metered using the remaining fill level or uses the cleaning agent regularly, then despite the fact that a reorder has been made, a delivery may sometimes not be sufficient or not come on time and might therefore be considered unreliable by the user.

Against the background of the described prior art, the problem addressed by the present disclosure is therefore to at least partially reduce or prevent the above-described issues, i.e. in particular to provide for simple and reliable reordering of cleaning agent for the user.

BRIEF SUMMARY

A method is provided for monitoring a supply of a cleaning agent. The method includes performing a check of whether the supply of the cleaning agent is likely to be used up. The check is based, at least in part, on quantity information which is representative of an amount of the cleaning agent in a user's supply and on consumption information which is indicative of the user's expected consumption behavior with respect to the cleaning agent. Further, a device is provided for performing the method for monitoring the supply of the cleaning agent.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

DETAILED DESCRIPTION

The following detailed description is merely exemplary in nature and is not intended to limit the disclosure or the application and uses of the subject matter as described herein. Furthermore, there is no intention to be bound by any theory presented in the preceding background or the following detailed description.

According to a first aspect of the present disclosure, a method is described which is carried out by at least one device and comprises checking whether it is likely that a cleaning agent will be used up, the check being based, at least in part, on quantity information which is representative of an amount of the cleaning agent in a user's supply and on consumption information which is indicative of the user's expected consumption behavior with respect to the cleaning agent.

A cleaning agent can be intended e.g. for personal hygiene, for laundry and textiles, for dishware, for surfaces or for other objects such as sanitary facilities or drains. Accordingly, a cleaning agent can be e.g. a soap, a shampoo, a shower gel, a liquid soap, a detergent (for example a general-purpose detergent or a color detergent), a softener, a dish detergent, a dishwasher detergent, a clear rinser, a neutral cleaner, a scouring agent, a window cleaning agent, a descaler, a limescale remover, a drain cleaner, an alcoholbased cleaner, an all-purpose cleaner, a glass cleaner, a sanitary cleaner, a toilet cleaner or a carpet cleaner.

In other words, a cleaning agent is not necessarily simply the agent that achieves the actual cleaning, but can also be understood as a cleaning agent aid or a cleaning additive such as a bleaching additive, a softener or laundry starch. A cleaning agent may also be a fluid, a disperse system, for example a gel or foam, or a solid material, in particular a tablet, powder or granular material.

A cleaning agent may for example comprise one or more components from the group of components including surfactants, alkalis, builders, graying inhibitors, optical brighteners, enzymes, bleaching agents, soil-release polymers, fillers, plasticizers, fragrances, dyes, conditioners, acids, starch, isomalt, sugar, cellulose, cellulose derivatives, carboxymethylcellulose, polyetherimide, silicone derivatives, and/or polymethylimines.

A cleaning agent may also comprise one or more other components. These components include, but are not limited to, the group including bleach activators, complexing agents, builders, electrolytes, non-aqueous solvents, pH adjusters, perfume carriers, fluorescing agents, hydrotropic substances, silicone oils, bentonites, anti-redeposition agents, shrinkage-preventing agents, crease-preventing agents, dye transfer inhibitors, anti-microbial active ingredients, germicides, fungicides, antioxidants, preservatives, corrosion inhibitors, antistatic agents, bittering agents, ironing aids, repellents and impregnating agents, anti-swelling and anti-slip agents, and/or UV absorbers.

A supply of a cleaning agent is understood to mean e.g. the supply in a storage container. In this case, a storage container can be resealable. A storage container can be single-use packaging or a refillable container. A storage container is designed for receiving a solid and/or liquid detergent, for example. A storage container is for example designed as a box, a cardboard box, cardboard packaging, a pouch, a bag, a bottle or a cartridge. A storage container is for example made (at least in part) of cardboard, paper, plastics material, and/or foil. A supply is generally enough for repeated metering. For example, a plurality of cleaning processes (for example laundry cycles) can be carried out using one supply in a storage container.

The cleaning agent is provided for a cleaning device, for example. A cleaning device is a washing machine or a dishwasher, for example. A washing machine may be in particular an automatic domestic washing machine for textiles.

The washing machine can have various different designs. A distinction is made between top-loading washing machines, in which the loading opening is on the top, and front-loading washing machines, in which a porthole on the front serves as the loading opening. An advantage of top-loading washing machines is that it is easier to construct the door seal and the drum can be supported on two sides by roller bearings. A top-loading washing machine can also be positioned in very small spaces where there is not enough room to open a front door. By contrast, a front-loading washing machine provides space on top for e.g. a tumble dryer or for a worktop, and is therefore sometimes built into a kitchen unit instead of a floor unit. Top-loading washing machines are disadvantageous since they require a greater volume of water for washing laundry than front-loading washing machines.

American top-loading washing machines always have a rotating drum and mixing elements (agitators or discs), with the mixing elements being able to move in or counter to the rotational direction of the drum. The machines may have a suds circulator and injectors for the suds. In principle, a distinction is made between deep-fill and HE top-loading washing machines. Deep-fill top-loading washing machines operate using predetermined water levels, and therefore do not use load detection. HE machines generally have load detection and control the amounts of water in accordance therewith. The machines generally do not have an integrated heater, but are instead connected to a hot water feed.

In this case, the supply is stored in a storage container that is separate from the cleaning device, for example. The cleaning agent is metered manually by the user in this case. A metering aid, for example, can be provided for this purpose. Alternatively, it is also conceivable for the supply to be stored in a storage container which is or can be integrated in the cleaning device, for example a cartridge, which is in particular provided and/or designed for automated metering.

In principle, a user is understood to be a person or a group of people having access to the supply of the cleaning agent, for example. A user may therefore be understood as a single person or as a plurality of people.

A supply of a cleaning agent being used up is understood to mean that the storage container is emptied, for example completely emptied or emptied to the point that it is not possible to carry out a cleaning process using the remaining supply.

Checking whether it is likely that supply of the cleaning agent will be used up may in particular comprise an estimate or a prediction of consumption behavior. For example, it can be assumed that a supply of the cleaning agent is likely to be used up if it is determined that the supply of the cleaning agent will be used up in an amount of time which is no more than or is less than a predetermined time. For example, it can be assumed that a supply of the cleaning agent is likely to be used up if it is determined that the supply of the cleaning agent will fall below a threshold value or has already fallen below said threshold value (in a predetermined time).

In this case, the check is based on quantity information. Quantity information which is representative of the amount of a cleaning agent may for example be information from which the current amount of the cleaning agent can be derived, if necessary in combination with other information. For example, the quantity information specifies the current amount of the cleaning agent in the supply. Other information constitutes, for example, a conversion factor or other information that is known in advance, such as information on a property of the storage container, e.g. the size, volume or geometry thereof. The quantity information may also even directly specify the amount of the cleaning agent in an appropriate unit (for example a unit of volume such as the liter or cubic centimeter, or a unit of weight such as the gram). For example, the quantity information is stored as a data item or as data items, e.g. a data set.

The check is also based on consumption information. Consumption information which is indicative of the user's anticipated consumption behavior with respect to the cleaning agent therefore makes it possible in particular to predict or estimate the user's consumption behavior. Therefore, in contrast to the prior art, a check is not only based on quantity information (for example an absolute fill level), but also on information such as the speed or the rate at which the cleaning agent is used.

Since the consumption information may vary from user to user or from user group to user group, a check based on the quantity information and the consumption information makes it possible to check in a personalized and therefore more precise manner whether the supply of the cleaning agent is likely to be used up. It can therefore be determined more precisely when the storage container is likely to be empty, and an optimal purchasing time point for reordering a supply of the cleaning agent can be determined.

Consumption information may be information that specifies what amount of cleaning agent is used in what time or in what period of time, for example. Consumption information may specify e.g. what amount of the cleaning agent is used per application (i.e. per laundry cycle in the case of a detergent or detergent aid, for example). Another example of consumption information could be which use category (for example "high use," "average use" or "low use") the user falls under.

Consumption information is cleaning agent-specific, for example. In other words, different pieces of consumption information are used for different cleaning agents, even if e.g. the user is the same. Consumption information is user-specific, for example. In other words, different pieces of consumption information are used for different users, even when e.g. the cleaning agent is the same.

The one or more devices comprise, for example, one or more data processing systems set up using software and/or hardware in order to execute the respective steps of an exemplary method according to the first aspect. Examples of a data processing system are a computer, a desktop computer, a server, a thin client and/or a portable computer (mobile device) such as a laptop computer, a tablet computer, a wearable, a personal digital assistant or a smartphone.

According to a preferred embodiment of the method according to the first aspect, the method also comprises obtaining the quantity information which is representative of an amount of the cleaning agent in the supply, or information from which the quantity information can be derived.

Information from which the quantity information can be derived is for example information which is representative of an amount removed from the supply. If the previous amount of the cleaning agent in the supply is known, the amount of the cleaning agent still remaining in the supply can be deduced from the amount removed.

The quantity information or the information from which the quantity information can be derived is obtained for example on a device that carries out an exemplary method according to the first aspect. For example, the corresponding information is received, e.g. via a wireless or wired connection. For this purpose, the device has for example a communication interface designed for wired or wireless communication. The communication interface is e.g. a network interface. For this purpose, the communication interface is preferably designed for communicating with a communication system. Examples of a communication system are a local network (LAN), a wide area network (WAN), a wireless network (for example in accordance with the IEEE 802.11 standard, the Bluetooth (LE) standard and/or the NFC standard), a wired network, a mobile network, a telephone network, and/or the Internet.

According to a preferred embodiment of the method according to the first aspect, the quantity information is representative of a relative or absolute fill level of the cleaning agent in the supply.

An absolute fill level of the cleaning agent in the supply specifies, for example, an absolute amount of the cleaning agent, preferably in a unit of volume or weight. The amount is also in particular independent of the original supply. A relative fill level of the cleaning agent is for example a proportion of the cleaning agent still available with respect to the original supply, for example a percentual proportion.

According to a preferred embodiment of the method according to the first aspect, the method also comprises associating the quantity information which is representative of an amount of the cleaning agent in the supply with time information which is representative of a time at which the supply comprises the amount of the cleaning agent.

For example, the quantity information and time information can be assigned to one another. For example, the quantity information and the time information are stored in a data set in a database. The time information is a (digital) time stamp, for example. As has already been set out, the quantity information is representative of an amount of the cleaning agent in the supply, for example representative of an absolute or relative fill level of the cleaning agent in the supply. The database comprises, for example, a plurality of pieces of quantity information and time information, each piece of quantity information being associated with an assigned piece of time information.

According to a preferred embodiment of the method according to a first aspect, the method also comprises determining the consumption information which is indicative of likely consumption behavior.

The consumption information can be determined on the basis of predictive analytics, for example. Statistical techniques such as machine learning or data mining are used for this purpose, for example, current and/or historical data are analyzed in order to make predictions concerning future events, in this case the likely consumption behavior.

Machine learning is in particular understood to mean that an artificial system (for example a device according to the second aspect or a system according to the third aspect) learns from examples, and can generalize said examples following the learning phase. This means that it does not simply learn the examples by heart, but that patterns and regularities are recognized in the learning data. Various approaches can be taken for this purpose. Supervised learning, semi-supervised learning, unsupervised learning, reinforced learning and/or active learning can be used, for example. Supervised learning can for example be carried out by employing an artificial neural network (such as a recurrent neural network) or by employing a support vector machine. Unsupervised learning can for example also be carried out by employing an artificial neural network (e.g. an autoencoder). In particular the repeatedly obtained and/or determined quantity information and/or quality information is used, for example, as learning data.

According to a preferred embodiment of the method according to the first aspect, the consumption information which is indicative of likely consumption behavior is determined, at least in part, on the basis of one or more obtained pieces of quantity information that are each representative of an amount of the cleaning agent in the supply.

Alternatively or additionally, it is conceivable for the obtained and/or determined quantity information and/or quality information to be associated with other information, for example with the number and/or the age of the person in a household in order to produce a personalized consumption profile, or for example with the seasons in order to produce a seasonal consumption profile.

These measures make is possible to increase the reliability of a check as to whether a supply of the cleaning agent is likely to be used up.

The one or more obtained pieces of quantity information are for example from the same user or from different users. For example, obtained pieces of quantity information that are each representative of an amount of the cleaning agent in the supply are stored, e.g. in a database. The obtained pieces of quantity information can be used as a basis for determining the consumption information. A time curve of cleaning agent use can be derived from the obtained pieces of quantity information, in particular in conjunction with assigned pieces of time information. Said curve can be used as a basis for the likely consumption behavior. For example, it is assumed that a user will continue consumption behavior from the past.

According to a preferred embodiment of the method according to the first aspect, the consumption information takes into account, at least in part, previous consumption behavior of the user or of another user with respect to the cleaning agent.

Likely consumption behavior of the user can be determined from the past consumption behavior of the same user with respect to the cleaning agent. It is also conceivable for the consumption information to take into account the user's previous consumption behavior with respect to another cleaning agent. For example, high or low use of a detergent can also be used to infer correspondingly high or low use of a softener by the same user (and vice versa).

Alternatively or additionally, however, it is also advantageous for the consumption information to take into account, at least in part, previous consumption behavior of another user with respect to the cleaning agent. For example, high or low use of the same cleaning agent by another user can also be used to infer correspondingly high or low use by another user.

The consumption information takes into account seasonal differences in use, for example. It has been shown that different types and/or amounts of a cleaning agent are used depending on the season. The seasonal differences can also be taken into account by, for example, taking into account previous consumption information of the same user or of a different user.

According to a preferred embodiment of the method according to the first aspect, the consumption information takes into account, at least in part, a previous time curve of consumption of the cleaning agent, in particular a previous metered amount and/or a previous frequency of use of the cleaning agent.

A previous use time curve can for example be used in order to determine a future time curve, e.g. by employing extrapolation. When the frequency of use is high and/or the metered amount is high, it is for example likely that the supply will be used up more quickly than when the frequency of use and/or the metered amount are low.

According to a preferred embodiment of the method according to the first aspect, the method also comprises ordering or triggering ordering of a supply of the cleaning agent if the result of the check is that a supply of the cleaning agent is likely to be used up.

The method can therefore be considered in particular to be a method for the automated reordering of a cleaning agent. For example, the ordering or the triggering thereof comprises transmitting information which uniquely identifies a product, for example an item number, a product label, a product name, and/or a predetermined amount. In this case, the user does not have to worry about monitoring the supply or reordering the cleaning agent in order to replenish the supply.

According to a preferred embodiment of the method according to the first aspect, the method also comprises outputting or triggering output of an indication to a user that a supply of the cleaning agent is likely to be used up if the result of the check is that a supply of the cleaning agent is likely to be used up.

For example, an indication can be given on a data processing system, e.g. on a mobile device of the user. Alternatively, it is also conceivable for the indication to be given on a cleaning device (for example on a display element of the cleaning device) that uses the cleaning agent. For example, the indication comprises an optical, acoustic and/or haptic signal for the user. The user can be informed hereby that a supply of the cleaning agent is likely to be used up. The user can in this case manually order a supply of the cleaning agent.

According to a preferred embodiment of the method according to the first aspect, the method also comprises determining and/or providing quantity information which is representative of an amount of the cleaning agent in the supply, or information from which the quantity information can be derived.

The determining process comprises for example detecting the quantity information by employing a sensor apparatus. For example, the determining process comprises calculating the quantity information. The determined quantity information can for example be provided by the sensor apparatus. The quantity information is for example provided by a communication interface of the sensor apparatus. For example, the communication interface is designed for wired or wireless communication. The communication interface is e.g. a network interface. For this purpose, the communication interface is preferably designed for communicating with a communication system. Examples of a communication system are a local network (LAN), a wide area network (WAN), a wireless network (for example in accordance with the IEEE 802.11 standard, the Bluetooth (LE) standard and/or the NFC standard), a wired network, a mobile network, a telephone network, and/or the Internet.

According to a preferred embodiment of the method according to the first aspect, the quantity information which is representative of an amount of the cleaning agent in the supply is determined and/or provided by employing a sensor apparatus of a storage container.

The storage container may comprise the supply of the cleaning agent. As has already been set out, the storage container may be designed as a box, a cardboard box, cardboard packaging, a pouch, a bag, a bottle or a cartridge.

A sensor apparatus may comprise one or more sensors, for example. For example, the sensor apparatus comprises an optical sensor, a conductivity sensor and/or a sensor which analyzes transit times. An optical sensor comprises, for example, a photodiode and optionally a light-emitting diode. For example, the (interior) space of the storage container can be measured by employing an optical sensor. A conductivity sensor comprises, for example, two (or more) electrodes. These are arranged such that they come into contact with the cleaning agent in the storage container. A sensor which analyzes transit times comprises, for example, a transmitter and a receiver. For example, the sensor which analyzes transit times is an optical sensor, an ultrasound-based sensor or a radar-based sensor. For example, a pulse is emitted from the transmitter. The pulse transit time is the time that the pulse needs in order to be reflected toward the receiver. By measuring this transit time, it is possible to calculate a distance from the speed. Therefore, the transit time can be used as a measure for the fill level.

The sensor apparatus can also be part of a metering aid which can be assigned to a storage container.

However, according to one embodiment of the method according to the first aspect, it is preferred for the sensor apparatus to be integrated in the storage container that comprises the supply.

According to a preferred embodiment of the method according to the first aspect, the quantity information which is representative of an amount of the cleaning agent in the supply is determined and/or provided depending on or independently of a use of the cleaning agent in the supply.

If the determining and/or providing process is carried out independently of a use of the cleaning agent, the determining or providing process can be predetermined, so that carrying out the determining or providing process too frequently or too infrequently can be avoided, for example.

However, if the quantity information is determined and/or provided depending on a use of the cleaning agent in the supply, the energy consumption of a sensor device can be optimized, for example. For example, an idle state (which can for example be exemplified by low energy consumption) and an active mode can be provided for a sensor apparatus, or for a part thereof. Using the corresponding storage container switches the sensor apparatus from the idle state to the active mode. The quantity information can then be determined and preferably also provided. The sensor apparatus can subsequently be switched back to the idle state.

In particular, individual method steps (for example those of obtaining information, checking whether the cleaning agent is going to be used up imminently and/or determining a consumption profile) which do not necessarily need to be carried out by employing the sensor apparatus can be carried out by another device that is connected, in particular by employing a communication system, to the device having the sensor apparatus. A further device of this kind may be for example a server and for example a part or component of a computer cloud, which provides data processing resources dynamically for different users in a communication system. A computer cloud is understood to mean in particular a data-processing infrastructure in accordance with the definition from the National Institute of Standards and Technology (NIST) for the term "cloud computing." One example of a computer cloud is a Microsoft Windows Azure platform.

According to the first aspect of the present disclosure, a device is also described that is designed or comprises corresponding means for carrying out and/or controlling a method according to the first aspect.

According to the first aspect of the present disclosure, a device is described that comprises at least one processor and at least one memory comprising computer program code, the at least one memory and the computer program code being configured for carrying out and/or controlling at least one method according to the first aspect using the at least one processor. A processor is for example intended to be understood to mean a control unit, a microprocessor, a microcontrol unit such as a microcontroller, a digital signal processor (DSP), an application-specific integrated circuit (ASIC) or a field-programmable gate array (FPGA).

For example, an exemplary device further comprises means for storing information, such as a program memory and/or a main memory. For example, an exemplary device as contemplated herein further comprises means for respectively receiving and/or transmitting information over a network, such as a network interface. For example, exemplary devices as contemplated herein are and/or can be interconnected via one or more networks.

An exemplary device according to the first aspect is or comprises for example a data processing system set up using software and/or hardware in order to execute the respective steps of an exemplary method according to the first aspect. Examples of a data processing system are a computer, a desktop computer, a server, a thin client and/or a portable computer (mobile device) such as a laptop computer, a tablet computer, a wearable, a personal digital assistant or a smartphone.

According to the first aspect of the present disclosure, a computer program is also described that comprises program instructions that prompt a processor to execute and/or control a method according to the first aspect when the computer program is running on the processor. An exemplary program as contemplated herein may be stored in or on a computer-readable memory medium which contains one or more programs.

According to the first aspect of the present disclosure, a computer-readable memory medium is also described which contains a computer program according to the first aspect. A computer-readable memory medium can be designed, for example, as a magnetic, electrical, electromagnetic, optical and/or other memory medium. A computer-readable memory medium of this type is preferably a physical object (i.e. "tangible"); for example, it is designed as a data carrier device. A data carrier device of this type is for example portable or permanently installed in a device. Examples of a data carrier device of this type are volatile or non-volatile memories with random access (RAM), such as NOR flash memories, or with sequential access, such as NAND flash memories, and/or memories with read-only access (ROM) or read/write access. Computer-readable is for example intended to be understood to mean that the memory medium can be read (out) and/or written by a computer or a data processing system, for example by a processor.

According to a second aspect of the present disclosure, a system is also described which comprises a plurality of devices, in particular comprising a device according to the first aspect, which together are designed to carry out a method according to the first aspect.

An exemplary system according to the second aspect comprises an exemplary device according to the first aspect, for example a mobile device or a server, and also a storage container having a sensor apparatus.

The exemplary embodiments of the present disclosure described above in this description are also intended to be understood to be disclosed in any combination with one another. In particular, exemplary embodiments are intended to be understood to be disclosed in relation to different aspects.

Further advantageous, exemplary embodiments of the present disclosure are found in the following detailed description of some exemplary embodiments of the present disclosure, in particular in conjunction with the drawings. The drawings are, however, only provided for illustrative purposes, and do not serve to define the scope of protection of the present disclosure. The drawings are not to scale and are merely intended to provide an example of the general concept of the present disclosure. In particular, features contained in the drawings are not in any way intended to be considered as necessary components of the present disclosure.

BRIEF DESCRIPTION OF THE DRAWINGS

The present disclosure will hereinafter be described in conjunction with the following drawing figures, wherein like numerals denote like elements, and.

Figure 1:
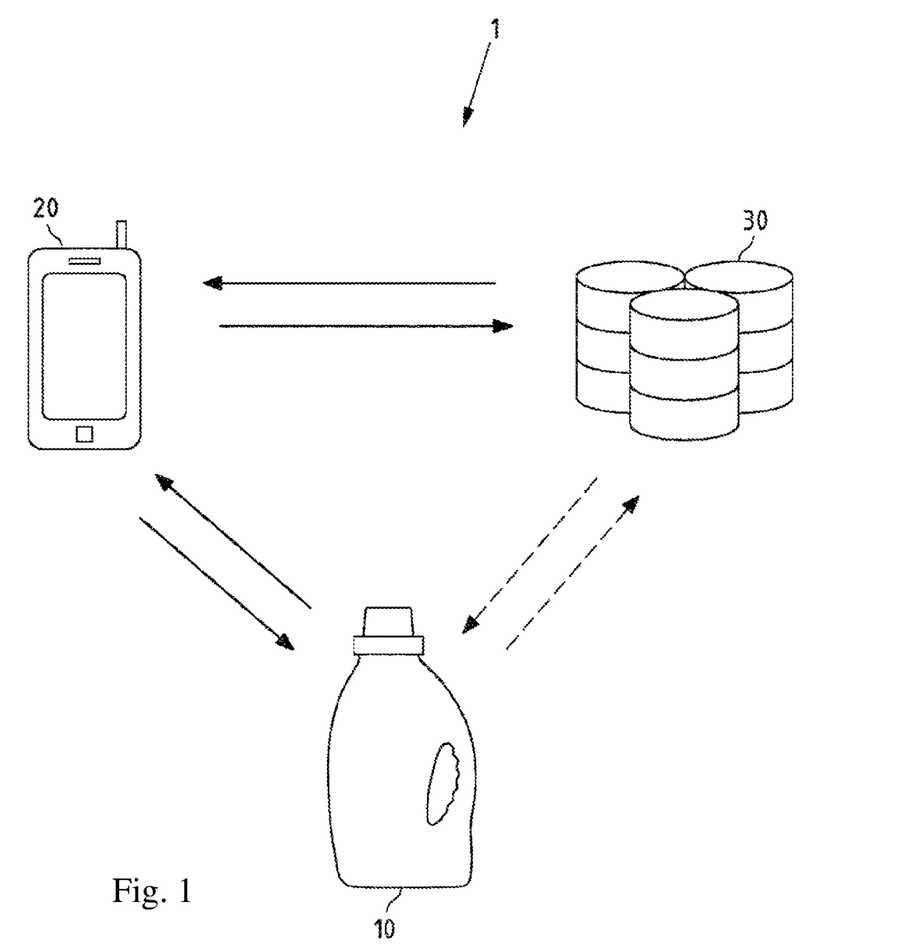
FIG. 1 shows an exemplary system according to the second aspect comprising exemplary devices according to the first aspect.

FIG. 1 firstly shows an exemplary system 1 according to the second aspect comprising exemplary devices 10, 20, 30 which can each be a device according to the first aspect.

The system 1 comprises an exemplary storage container 10 which has a supply of a cleaning agent. In this case, the storage container 10 is designed as a plastics bottle. Other storage containers can also be provided, however. Furthermore, the system 1 comprises a mobile device 20 in the form of a smartphone. The system 1 lastly comprises a server 30 which can in particular be spatially remote.

The storage container 10 comprises a sensor device (not shown) which is designed for determining the fill level of the cleaning agent in the storage container 10, and therefore for determining quantity information which is representative of the amount of the cleaning agent in the supply (or information from which the quantity information can be derived).

The storage container 10 also has a communication interface. In this way, the quantity information can be provided to other devices. In particular, the quantity information can be sent to the mobile device 20.

The mobile device 20 also has a communication interface in order to obtain the quantity information of the storage container 10.

In principle, the information obtained or determined by the mobile device 20 can be transferred to the server 30. The mobile device 20 can likewise obtain information from the server 30. Alternatively or additionally, it is conceivable for the storage container 10 to communicate directly with the server 30, instead of communicating with the mobile device 20.

Figure 2:
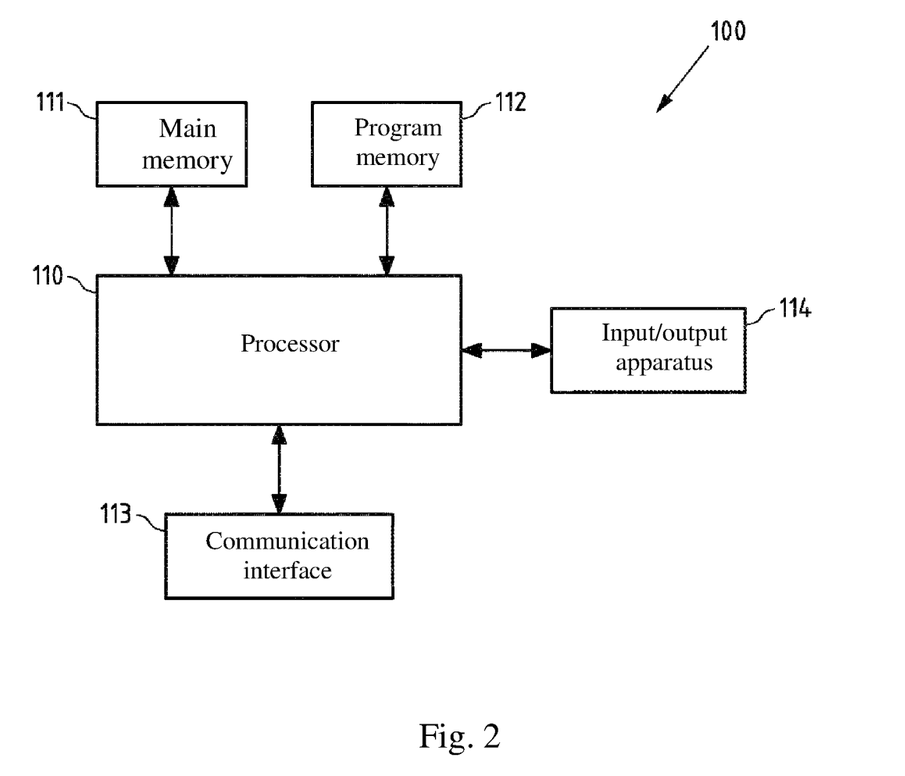
FIG. 2 is a block diagram of an exemplary device according to the different aspects.

FIG. 2 is a block diagram of an embodiment of a device 100, which in particular can carry out an exemplary method according to the first aspect. The device 100 is for example a device according to the first or second aspect. The device 100 is an example of the devices 20 and/or 30 in FIG. 1 (or a part thereof). It would also be conceivable for the storage container 10 to comprise a sensor apparatus which has individual components or all the components from FIG. 2.

In this respect, the device 100 may for example be a computer, a desktop computer, a server, a thin client or a portable computer (mobile device), such as a laptop computer, a tablet computer, a personal digital assistant (PDA) or a smartphone. The device may for example perform the function of a server or a client.

The processor 110 of the device 100 is in particular designed as a microprocessor, a microcontrol unit, a microcontroller, a digital signal processor (DSP), an application-specific integrated circuit (ASIC) or a field-programmable gate array (FPGA).

The processor 110 executes program instructions that are stored in the program memory 112, and for example stores intermediate results or the like in a working memory or main memory 111. For example, the program memory 112 is a non-volatile memory such as a flash memory, a magnetic memory, an EEPROM memory (electrically erasable programmable read-only memory) and/or an optical memory. The main memory 111 is for example a volatile or non-volatile memory, in particular a memory with random access (RAM) such as a static RAM memory (SRAM), a dynamic RAM memory (DRAM), a ferroelectric RAM memory (FeRAM), and/or a magnetic RAM memory (MRAM).

The program memory 112 is preferably a local data carrier that is permanently connected to the device 100. Data carriers that are permanently connected to the device 100 are for example hard drives that are integrated in the device 1. Alternatively, the data carrier may for example also be a data carrier that can be detachably connected to the device 100, such as a memory stick, a removable data carrier, a portable hard drive, a CD, a DVD, and/or a floppy disk.

The program memory 112 for example contains the operating system of the device 100, which is loaded in the main memory 111, at least in part, and is executed by the processor 110 when the device 100 is started up. In particular, when starting up the device 100, at least part of the core of the operating system is loaded in the main memory 111 and executed by the processor 110. The operating system of the device 100 is for example a Windows, UNIX, Linux, Android, Apple iOS, and/or MAC operating system.

The operating system in particular allows the device 100 to be used for data processing. It for example manages operating equipment such as the main memory 111 and the program memory 112, the network interface 113, and the input and output apparatus 114, inter alia provides basic functions by employing programming interfaces of other programs, and controls the execution of programs.

The processor 110 controls the communication interface 113, which for example may be a network interface and may be designed as a network card, network module, and/or modem. The communication interface 113 is in particular designed to establish a connection between the device 100 and other devices, in particular via a (wireless) communication system, for example a network, and to communicate therewith. The communication interface 113 may for example receive data (via the communication system) and forward said data to the processor 110, and/or receive and transmit data from the processor 110 (via the communication system). Examples of a communication system are a local network (LAN), a wide area network (WAN), a wireless network (for example in accordance with the IEEE 802.11 standard, the Bluetooth (LE) standard and/or the NFC standard), a wired network, a mobile network, a telephone network, and/or the Internet.

Furthermore, the processor 110 can control at least one input/output apparatus 114. The input/output apparatus 114 is for example a keyboard, a mouse, a display unit, a microphone, a touch-sensitive display unit, a speaker, a reader, a drive, and/or a camera. The input/output apparatus 114 may for example receive user inputs and forward said inputs to the processor 110, and/or receive and output information for the user from the processor 110.

Figure 3:
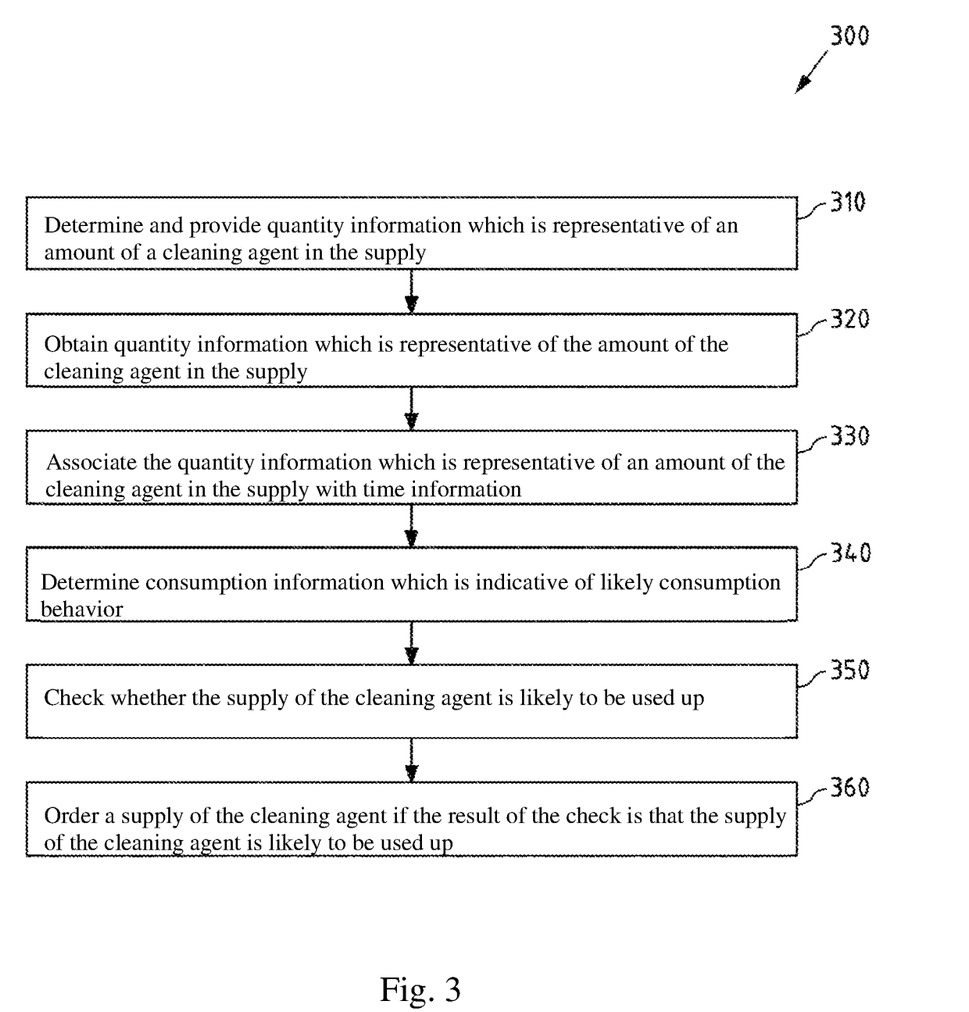
FIG. 3 is a flow diagram of an exemplary method according to the first aspect.

FIG. 3 is a flow diagram 300 of an exemplary method according to the first aspect. Quantity information which is representative of an amount of the cleaning agent in the supply in the storage container 10 is first determined (action 310). For this purpose, the storage container 10 has an integrated sensor apparatus which can detect the fill level of the cleaning agent in the storage container 10. The quantity information is provided by the sensor apparatus of the storage container 10 to the mobile device 20 via a communication interface (action 310). This is carried out after the cleaning agent in the storage container 10 has been used, for example.

Figure 4A:
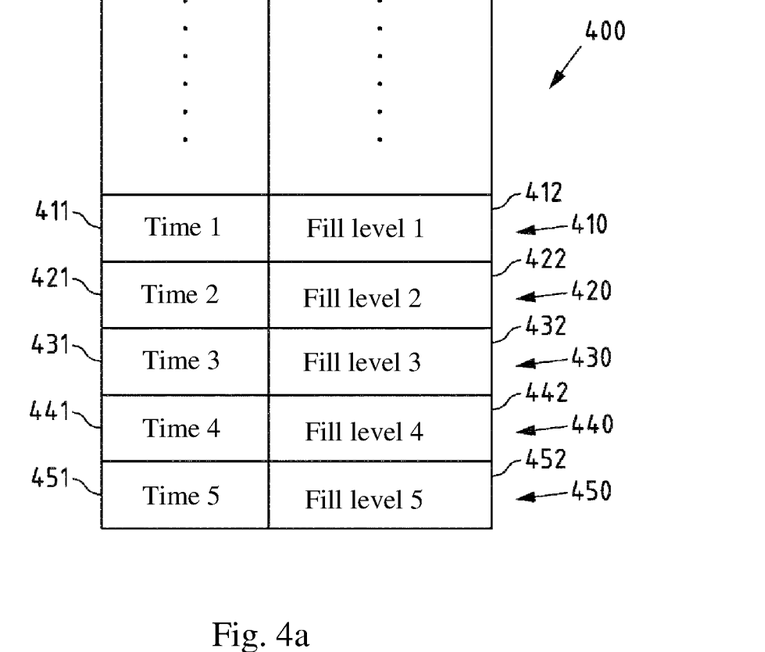
FIG. 4a and FIG. b are schematic representations of pieces of quantity information.

The quantity information can then be received by the mobile device 20 (action 320) and, if necessary, forwarded to the server 30. A database 400 having data sets 410, 420, 430, 440, 450, as shown by way of example in FIG. 4, is provided in the mobile device 20 (and/or in the server 30). Each data set in the database 400 contains quantity information which is representative of an absolute fill level 412, 422, 432, 442, 452. Each data set also has a digital time stamp 411, 421, 431, 441, 451 owing to each piece of quantity information being associated with a piece of time information (action 330). In this case, it is possible for the quantity information to have already been associated with the time information by employing the sensor apparatus of the storage container 10, or it can be associated later, for example by employing the mobile device 20 or the server 30.

For example, the data set 450 may be the current data set with the current fill level, while the data sets 410, 420, 430, 440 were obtained from a previous use of the cleaning agent by the user.

The data sets 410, 420, 430, 440 are an example of consumption information. However, consumption information can also be determined on the basis of, for example, the data sets 410, 420, 430, 440 (action 340).

Figure 4B:
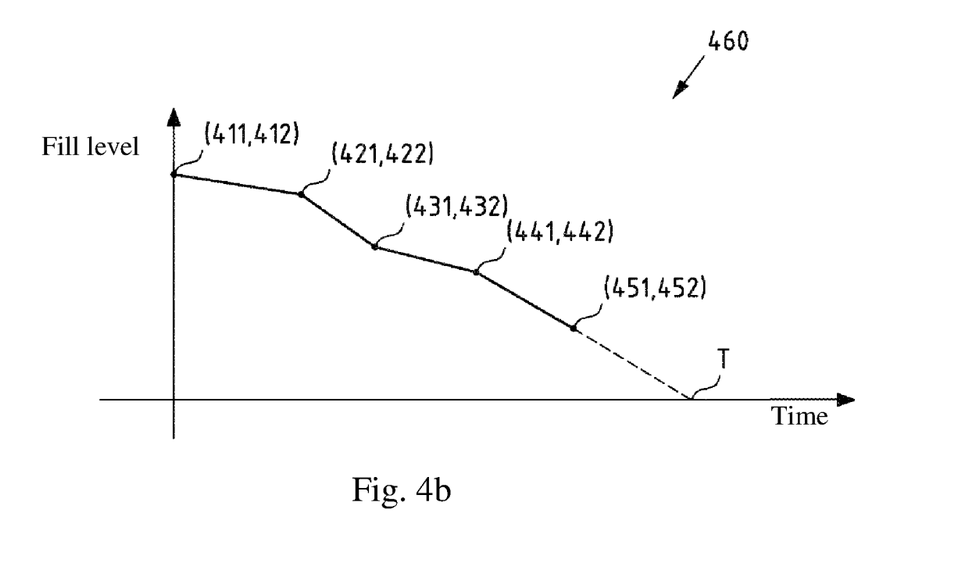

FIG. 4b is a graphical representation of the time curve 460 of cleaning agent consumption on the basis of the information in data sets 410, 420, 430, 440, 450, the fill level being plotted against time. A time point T at which the supply will be used up can be predicted by extrapolation (for example using regression).

It is subsequently checked whether the supply of the cleaning agent is likely to be used up (action 350). This can for example be the case if the time point T will arrive in less than or no more than a predetermined time period.

If the result of the check is that the supply of the cleaning agent is likely to be used up (action 350), a supply of the cleaning agent is ordered (action 360).

In this case, the steps 320, 330, 340, 350 and 360 can be carried out exclusively by the mobile device 20, exclusively by the server 30 or jointly by the mobile device 20 and the server 30.

Figure 5:
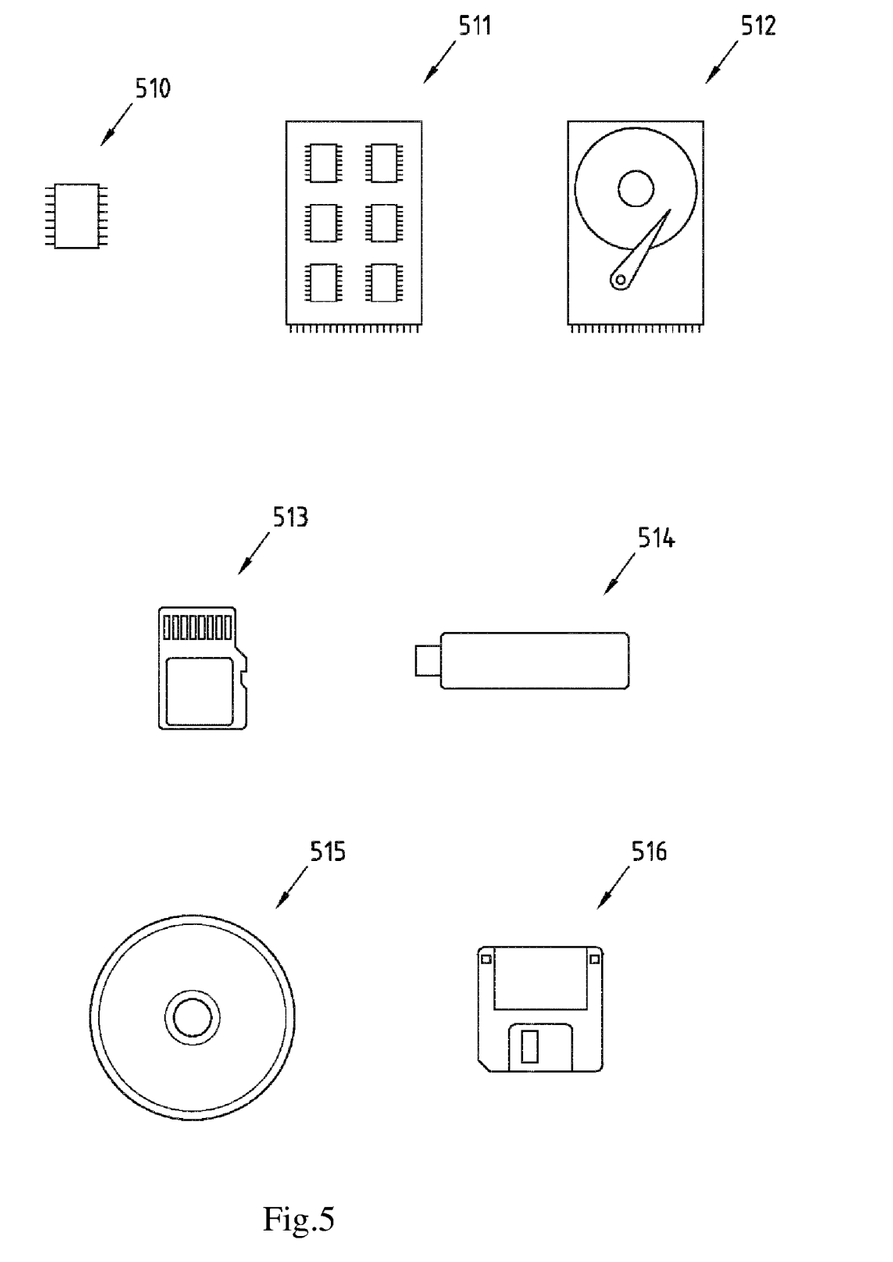
FIG. 5 shows different embodiments of a memory medium.

Lastly, FIG. 5 shows different embodiments of memory media on which an embodiment of a computer program as contemplated herein can be stored. The memory medium may for example be a magnetic, electrical, optical and/or other memory medium. The memory medium can, for example, be part of a processor (e.g. of the processor 110 in FIG. 2), for example a (non-volatile or volatile) program memory of the processor or a part thereof (such as the program memory 112 in FIG. 2). Embodiments of a memory medium are a flash memory 510, an SSD hard drive 511, a magnetic hard drive 512, a memory card 513, a memory stick 514 (e.g. a USB stick), a CD-ROM or DVD 515, or a floppy disk 516.

The embodiments of the present disclosure described in this specification and the optional features and properties set out in this regard in each case are also intended to be understood to be disclosed in any combination with one another. In particular, the description of a feature comprised by an embodiment, unless explicitly stated otherwise, is not intended in the present case to be understood to mean that the feature is necessary or essential for the function of the embodiment. The sequence of the method steps set out in this specification in the individual flow diagrams is not compulsory, and alternative sequences of the method steps are conceivable. The method steps can be implemented in different ways, and therefore implementation in software (by employing program instructions), hardware, or a combination of the two are conceivable for implementing the method steps.

Terms used in the claims such as "comprise," "have," "include," "contain" and the like do not exclude additional elements or steps. The wording "at least in part" covers both "partly" and "completely." The wording "and/or" is intended to be understood such that both the alternative and the combination are intended to be disclosed, i.e. "A and/or B" means "(A) or (B)" or "(A and B)." The use of the indefinite article does not exclude a plurality. An individual device can perform the function of a plurality of units or devices mentioned in the claims. Reference signs in the claims should not be considered limiting to the means and steps used.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

The invention claimed is:

1. A method for monitoring a supply of a cleaning agent of a storage container that is integrated into a washing machine appliance, the method comprising:
   obtaining, via a sensor that is integrated into the storage container, sensor data that includes quantity information which is representative of a fill level of the cleaning agent in a user's supply in the storage container;
   obtaining, via a processor, prior consumption information which is indicative of prior usage of the cleaning agent by the user, wherein the prior consumption information takes into account, at least in part, a previous metered amount and a previous frequency of use of the cleaning agent;
   determining expected future consumption behavior of the user with respect to the cleaning agent, via the processor using machine learning with the prior consumption information;
   determining, via the processor, whether the supply of the cleaning agent is likely to be used up, based on both the fill level of the cleaning agent and the expected future consumption; and
   taking an action, via instructions provided by the processor, when it is determined that the supply of the cleaning agent is likely to be used up.

2. The method according to claim 1, the method further comprising:
   associating the quantity information which is representative of an amount of the cleaning agent in the supply with time information which is representative of a time at which the supply comprises the amount of the cleaning agent; and
   determining the prior consumption information, via the processor, based on the time information in combination with the quantity information obtained at multiple different periods of time.

3. The method according to claim 1, wherein the taking of the action comprises:
   ordering or triggering of a supply of the cleaning agent, via instructions provided by the processor, if it is determined that the supply of the cleaning agent is likely to be used up.

4. The method according to claim 1, wherein the taking of the action comprises:
   outputting or triggering output of an indication to the user that supply of the cleaning agent is likely to be used up, via instructions provided by the processor, if it is determined that the supply of the cleaning agent is likely to be used up.

5. The method according to claim 1, the method further comprising:
   providing, for the user, via instructions provided by the processor, the quantity information which is representative of an amount of the cleaning agent in the supply, or information from which the quantity information can be derived.

6. The method of claim 1, wherein the step of determining the expected future consumption behavior comprises:
   determining the expected future consumption behavior of the user with respect to the cleaning agent, via the processor using machine learning with the prior consumption information via a neural network.

7. The method of claim 5, wherein the step of determining the expected future consumption behavior comprises:
   determining the expected future consumption behavior of the user with respect to the cleaning agent, via the processor using machine learning with the prior consumption information along with an age of the user.

8. The method of claim 1, wherein the step of determining the expected future consumption behavior comprises:
   determining the expected future consumption behavior of the user with respect to the cleaning agent, via the processor using machine learning with the prior consumption information along with a quantity of users that utilize the user's supply.

9. The method of claim 1, wherein the step of determining the expected future consumption behavior comprises:
   determining the expected future consumption behavior of the user with respect to the cleaning agent, via the processor using machine learning with the prior consumption information along with a current season.

10. The method of claim 9, wherein the step of determining the expected future consumption behavior comprises:
    determining the expected future consumption behavior of the user with respect to the cleaning agent, via the processor using machine learning with the prior consumption information along with the current season via a seasonal time curve.

11. The method of claim 1, further comprising:
    communicating the sensor data from the sensor to a mobile phone of the user that is located in proximity to the storage container.

12. The method of claim 11, wherein the processor is part of the mobile phone of the user, and the steps of obtaining the prior consumption information, determining the expected future consumption, determining whether the supply of the cleaning agent is likely to be used up are performed via the processor of the mobile phone.

13. The method of claim 11, wherein the processor is coupled to a remote server which includes the processor, and the steps of obtaining the prior consumption information, determining the expected future consumption, determining whether the supply of the cleaning agent is likely to be used up are performed via the processor of the remote server.

14. A system for monitoring a supply of a cleaning agent of a storage container that is integrated into a washing machine appliance, the system comprising:
    a sensor that is that is integrated into the storage container, the sensor configured to at least facilitate obtaining sensor data that includes a fill level of the cleaning agent in a user's supply in the storage container; and
    a processor that is coupled to the sensor and that is configured to at least facilitate:
      obtaining prior consumption information which is indicative of prior usage of the cleaning agent by the user, wherein the prior consumption information takes into account, at least in part, a previous metered amount and a previous frequency of use of the cleaning agent;
      determining expected future consumption behavior of the user with respect to the cleaning agent, via the processor using machine learning with the prior consumption information;
      determining whether the supply of the cleaning agent is likely to be used up, based on both the fill level of the cleaning agent and the expected future consumption; and
      taking an action when it is determined that the supply of the cleaning agent is likely to be used up.

15. The system of claim 14, further comprising:
    a mobile phone of the user that is configured to be disposed in proximity to the storage container and the washing machine appliance and to be communicatively coupled to the sensor, wherein the processor is part of the mobile phone.

16. The system of claim 14, further comprising:
    a mobile phone of the user that is configured to be disposed in proximity to the storage container and the washing machine appliance and to be communicatively coupled to the sensor; and
    a remote server that is configured to be communicatively coupled to the mobile phone, wherein the processor is part of the remote server.

17. A system for monitoring a supply of a cleaning agent of a storage container that is integrated into a washing machine appliance, the system comprising:
    a sensor that is integrated into the storage container, the sensor configured to at least facilitate obtaining sensor data that includes a fill level of the cleaning agent in a user's supply in the storage container; and
    a mobile phone that is configured to be disposed in proximity to the storage container, the mobile phone including a processor that is coupled to the sensor and to a remote server, the processor configured to at least facilitate:
      obtaining prior consumption information which is indicative of prior usage of the cleaning agent by the user, wherein the prior consumption information takes into account, at least in part, a previous metered amount and a previous frequency of use of the cleaning agent;
      determining expected future consumption behavior of the user with respect to the cleaning agent, using the prior consumption information;
      determining whether the supply of the cleaning agent is likely to be used up, based on both the fill level of the cleaning agent and the expected future consumption; and
      taking an action when it is determined that the supply of the cleaning agent is likely to be used up.

18. The system of claim 17, wherein the processor is configured to at least facilitate determining the expected future consumption behavior of the user with respect to the cleaning agent using machine learning with the prior consumption information.

* * * * *